(12) United States Patent
Hahn

(10) Patent No.: US 12,109,691 B2
(45) Date of Patent: Oct. 8, 2024

(54) CONTAINER HANDLING SYSTEM

(71) Applicant: KRONES AG, Neutraubling (DE)

(72) Inventor: Wolfgang Hahn, Neutraubling (DE)

(73) Assignee: KRONES AG, Neutraubling (DE)

( * ) Notice: Subject to any disclaimer, the term of this patent is extended or adjusted under 35 U.S.C. 154(b) by 896 days.

(21) Appl. No.: 17/052,501

(22) PCT Filed: Mar. 4, 2019

(86) PCT No.: PCT/EP2019/055248
§ 371 (c)(1),
(2) Date: Nov. 2, 2020

(87) PCT Pub. No.: WO2019/211023
PCT Pub. Date: Nov. 7, 2019

(65) Prior Publication Data
US 2021/0170573 A1    Jun. 10, 2021

(30) Foreign Application Priority Data

May 3, 2018 (DE) .................... 10 2018 206 823.2

(51) Int. Cl.
*B25J 9/00* (2006.01)
*B25J 13/00* (2006.01)
*B65G 7/00* (2006.01)

(52) U.S. Cl.
CPC ............. *B25J 9/0006* (2013.01); *B25J 13/00* (2013.01); *B65G 7/00* (2013.01); *B65G 2201/0235* (2013.01)

(58) Field of Classification Search
CPC .......... B25J 9/0006; B25J 13/00; B65G 7/00; B65G 2201/0235; B67C 3/22
See application file for complete search history.

(56) References Cited

U.S. PATENT DOCUMENTS

| | | | |
|---|---|---|---|
| 10,532,000 B1 * | 1/2020 | De Sapio | A63B 24/0062 |
| 10,561,563 B2 * | 2/2020 | Herr | B25J 9/0006 |
| 11,234,890 B2 * | 2/2022 | Ahn | A61B 5/7267 |
| 2011/0040216 A1 | 2/2011 | Herr et al. | |
| 2012/0004581 A1 | 1/2012 | Dinon | |
| 2014/0277739 A1 * | 9/2014 | Kornbluh | F16D 28/00 29/428 |

(Continued)

FOREIGN PATENT DOCUMENTS

| | | |
|---|---|---|
| CN | 102922508 A | 2/2013 |
| CN | 105188633 A | 12/2015 |

(Continued)

OTHER PUBLICATIONS

ISA European Patent Office, International Search Report Issued in Application No. PCT/EP2019/055248, Jun. 21, 2019, WIPO, 2 pages.

(Continued)

*Primary Examiner* — Masud Ahmed
(74) *Attorney, Agent, or Firm* — McCoy Russell LLP

(57) ABSTRACT

The invention relates to a container handling system, comprising an exoskeleton which is designed in such a way that it supports movements carried out by an operator of the container handling system for lifting and/or lowering objects, in particular system parts or working material.

20 Claims, 1 Drawing Sheet

(56) References Cited

U.S. PATENT DOCUMENTS

| | | | | |
|---|---|---|---|---|
| 2015/0075303 A1* | 3/2015 | Connor | .............. | A41D 13/1281 |
| | | | | 73/865.4 |
| 2015/0223959 A1 | 8/2015 | Cempini et al. | | |
| 2016/0166454 A1* | 6/2016 | Johnson | ................ | A61H 3/008 |
| | | | | 280/1.5 |
| 2016/0338644 A1* | 11/2016 | Connor | ................ | A61B 5/1126 |
| 2017/0173783 A1* | 6/2017 | Angold | .................... | B25J 9/109 |
| 2018/0235831 A1* | 8/2018 | Jang | ..................... | A61B 5/1071 |
| 2019/0202060 A1* | 7/2019 | Aaron | .................... | H04R 1/028 |
| 2020/0008583 A1* | 1/2020 | Gunura | .................... | A47C 9/10 |
| 2020/0179213 A1* | 6/2020 | Krumholz | ............ | A61H 1/0274 |

FOREIGN PATENT DOCUMENTS

| | | |
|---|---|---|
| CN | 105832496 A | 8/2016 |
| CN | 106344354 A | 1/2017 |
| DE | 102011054890 A1 | 5/2013 |
| TW | 201628677 A | 8/2016 |
| WO | 2014195373 A1 | 12/2014 |
| WO | 2017157941 A1 | 9/2017 |

OTHER PUBLICATIONS

China National Intellectual Property Administration, Office Action and Search Report Issued in Application No. 201980029717.X, Feb. 15, 2023, 13 pages. (Submitted with Machine Translation).
China National Intellectual Property Administration, Office Action and Search Report Issued in Application No. 201980029717.X, Aug. 29, 2023, 17 pages. (Submitted with Machine Translation).

\* cited by examiner

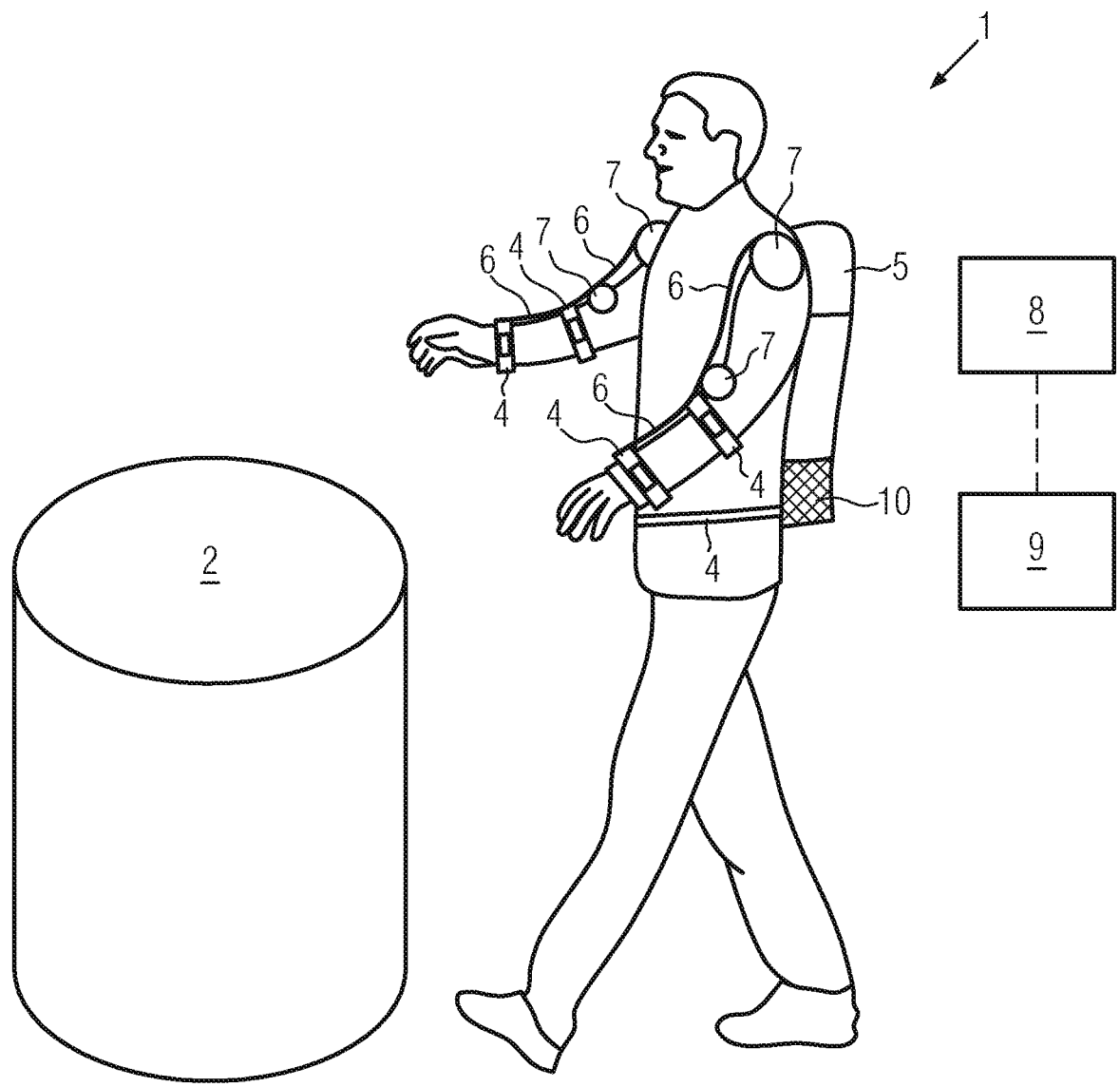

CONTAINER HANDLING SYSTEM

CROSS-REFERENCE TO RELATED APPLICATIONS

The present application is a U.S. National Phase of International Patent Application Serial No. PCT/EP2019/055248 entitled "CONTAINER HANDLING SYSTEM," filed on Mar. 4, 2019. International Patent Application Serial No. PCT/EP2019/055248 claims priority to German Patent Application No. 10 2018 206 823.2 filed on May 3, 2018. The entire contents of each of the above-referenced applications are hereby incorporated by reference for all purposes.

TECHNICAL FIELD

The invention refers to a container handling system for the handling of containers, in particular bottles or cans.

BACKGROUND AND SUMMARY

During the operation, maintenance or conversion of container handling systems, especially in the beverage industry, there are various tasks for which it is intended and advantageous that they are carried out manually by an operator, but which, at least for some operators, represent a body burden that is too high from an ergonomic or health point of view. In particular, these are tasks in which loads are lifted. Typical tasks are, for example, the exchange of system elements, the provision or exchange of working material or the conversion of the system, for example during a format change, where the system is changed over to a different container format.

It is known to provide lifting or hoisting tools as an aid to the operator to relieve the strain on the operator. However, due to the lack of fine motor skills that are available when the operator is performing the task immediately, such tools cannot be used for all tasks. Furthermore, such aids are often configured for specific tasks. If this is the case, different aids must be provided for different tasks. The use of such aids is also only possible to a limited extent or not at all, for example, depending on the accessibility of the affected system part.

Furthermore, it is known to perform tasks completely with robots. In this case, very specialized robots can be used, but as with the above mentioned tools, this means that different robots must be provided for different tasks. Alternatively, more versatile robots can be used. However, these are more complex both in design and in control and are therefore expensive, maintenance-intensive and prone to errors.

The invention is thus based on the object of providing a container handling system which enables various tasks to be carried out at comparatively low cost without excessive body burden and health hazards for operators of the system.

The object is solved by the subject matter of claim 1. In particular, the object is solved by the fact that the container handling system comprises an exoskeleton which is configured in such a way that it supports movements performed by an operator of the container handling system for lifting and/or lowering objects, in particular system parts or working material.

The exoskeleton is a device that can be worn on the body. The device may comprise, for example, struts, joints and/or weights which may be configured and arranged to imitate a part of a human skeleton. In particular, the exoskeleton may be an independent part of the container handling system. In other words, the exoskeleton may be usable without physical connection to other parts of the container handling system. The exoskeleton may be connected to other parts or units of the container handling system, in particular to one or more control devices of the container handling system, by means of one or more data links. The exoskeleton may also be physically connected to other parts of the container handling system.

The fact that the exoskeleton supports movements for lifting and/or lowering means that the operator only lifts a part of the mass of the object to be lifted by his own force at most. In other words, at least part of the force required for lifting and/or lowering, in particular all of the force required for lifting and/or lowering, is provided by the exoskeleton.

The movements may be movements the operator carries out for procedures to be performed manually during operation and/or set-up and/or maintenance of the container handling system.

The provision of such an exoskeleton thus makes it possible to protect the operator and, at the same time, to ensure high flexibility at low cost, because basically a wide variety of operations can be carried out by a human, so that no specialized tools or robots are needed for different operations. The exoskeleton is a universal tool that can be used largely independent of the task and at the same time prevents the operator from being subjected to excessive strain.

The container handling system may include, for example, labeling machines, printing machines, packing machines, palletizing machines, filling machines, blowing machines, and/or transport equipment. The tasks requiring movements for lifting and/or lowering may include, for example, inserting and/or removing working materials, exchanging modules, retrofitting for different container formats and/or removing and installing individual elements, for example drives or wearing parts. The containers can be bottles or cans, for example.

The exoskeleton can be configured to be attachable to one or both arms and optionally to the operator's torso. For example, the exoskeleton can strappable to the operator.

The exoskeleton may include at least one actuator, for example an electric motor, to assist lifting, and at least one traction element that allows power transmission from the actuator such that the power assists the lifting motion. Optionally, the exoskeleton may also comprise at least one deflection element, for example one or more pulleys and/or one or more joints. The exoskeleton may also include counterweights configured and arranged to stabilize the operator.

The exoskeleton may be configured in such a way that it allows the operator himself to grip the object to be lifted and control all or part of the lifting and/or lowering movements.

For example, the exoskeleton can be configured in such a way that it merely provides relief for the operator and the operator controls without restrictions the movement, in particular the direction of movement and the distance covered during the movement. Alternatively, the exoskeleton may be configured to guide or control the movements of the operator at least partially.

In such a case, for example, the operator can specify the basic direction of movement and, by means of appropriate design and/or control, the exoskeleton can only support and/or allow movement in this direction within a certain interval and outside this interval it cannot support and/or counteract the movement. This can be done, for example, by means of a control device which controls the drive(s) of the exoskeleton accordingly.

In the present application, the control device may be part of the exoskeleton or may constitute a separate part of the system or be integrated into another part of the system, in particular a central control system.

In principle, it is advantageous if the operator controls the movement at least partially by himself, because this allows great flexibility with regard to the tasks to be performed, especially the possibility to react to unforeseen situations. However, limiting the scope of movement can be used to protect the operator from injury and/or to protect system elements.

The exoskeleton may also be configured in such a way that it is possible to switch between an operating mode in which the movement is controlled entirely by the operator himself and an operating mode in which the movement is controlled partly by the operator and partly by the exoskeleton.

The exoskeleton may be configured to be adaptable to the operator, especially automatically.

The exoskeleton can be adaptable to an operator, for example, by adjusting the force to be exerted by the exoskeleton. In addition, the arrangement of individual elements such as attachment elements for attaching the exoskeleton to the operator or a counterweight can be adaptable to the operator.

This has the advantage that the same exoskeleton can be used for different operators, thus reducing acquisition costs. An automatic adjustment has the advantage that it is usually faster and more precise than a manual adjustment. In addition, operating errors during adaptation can be prevented.

For automatic adaptation, the respective operator can be identified, for example by means of the control device(s), whereby the control device can then control in particular one or more drives of the exoskeleton in such a way that the adaptation takes place. In particular, the control device can set the drive, for example the power of the drive, and/or a transmission ratio of the force between the drive and the traction element.

The identification of the operator can, for example, be based on a login process via input elements or on an automatic recognition of the operator. Such automatic recognition can be carried out, for example, by means of face recognition, a retina scanner and/or a fingerprint reader.

The exoskeleton may be configured in such a way that it is adaptable to the operator's physique, in particular to the height, leg length, torso length and/or arm length, and/or to the constitution of the operator, for example, proportion of muscle mass and/or strength in the torso and/or arms.

The adaptability of the exoskeleton to the physique may include the ability to change the arrangement of individual elements of the exoskeleton, such as fasteners for attachment to the operator and/or counterweights. In particular, the arrangement may be adjustable so that the exoskeleton can be properly attached to the operator and/or the center of gravity can be adjusted with the counterweight.

The adaptability of the exoskeleton to the physique may alternatively or additionally involve adjusting the force applied by the exoskeleton based on the physique. This can be done by adjusting the drive or transmission. For example, in the case of longer arms, due to the longer lever, it may be advantageous for the exoskeleton to apply more force than in the case of shorter arms.

The exoskeleton may be configured such that the arrangement of attachment elements for attachment to the body is manually adjustable and that the adjustment of the attachment elements by sensors is detected and used to adjust the force applied by the exoskeleton accordingly.

This ensures an optimal support effect for each operator.

The exoskeleton can be controllable by a control device in such a way that task-specific support is provided.

This means that the exoskeleton can be operated in different modes, adapted to the tasks to be performed.

Task-specific support can include, for example, that a certain force is applied by the exoskeleton depending on the task to be performed. In particular, the amount and direction of the force may vary depending on the task. For this purpose, the control device can be used, for example, to set the power of the drive element and/or a transmission ratio to the traction elements and/or a deflection of the force. In particular, the force can be controlled as a function of time. This ensures that no jerky movements take place, which can cause injury and increase the risk of collisions with other system parts.

Such task-specific support has the advantage that the operator can use the exoskeleton universally and optimally for different tasks and can be optimally supported. This is also particularly suitable for preventing operating errors that can occur, for example, due to inexperience or lack of concentration or because the task is complex.

The container handling system may comprise an input device with which the task to be performed can be settable by the operator, in particular by means of manual input or speech input, and/or a task recognition device which is configured in such a way that it automatically recognizes the task to be performed, in particular on the basis of the operator position relative to system parts of the container handling system and/or on the basis of pattern recognition in which movements of an operator are detected and automatically analyzed and the task to be performed which is assigned to the movement pattern is identified on the basis of a movement pattern recognized in the analysis.

Operator input may also involve setting a series of tasks to be sequentially performed. Alternatively or in addition, a sequence of tasks may be stored in the control device and the operator may, by setting and/or activating one of these tasks, activate the whole sequence of tasks so that he does not need to explicitly set or activate the tasks following the first task.

Automatic recognition of the task to be executed can be context-dependent. In particular, it is possible, for example, to recognize in which area of the system the operator is located and/or to recognize with which part of the system the operator is working by means of a movement pattern. With the help of stored data it can then be determined which task the operator is performing and the exoskeleton can be controlled so that movements corresponding to this task are supported.

The task to be performed may include one or more of the following tasks: Changing the blow mold on a blow molding machine for blow molding containers; changing modular units on modular machines, for example printing machines for printing containers or labeling machines; changing the vacuum cylinder for holding and transporting labels in labeling machines; changing format-dependent container transport devices and/or container lifting devices, in particular dividing stars, lifting stars and/or lowering stars; inserting and/or changing rolls of film in packaging machines, for example rolls of shrink film; inserting cardboard boxes in packaging machines; inserting intermediate layers in palletizing machines; emptying collecting containers; replacing rotary distributors and/or drives and/or gears.

All of the above processes are physically demanding, but can be carried out manually by an operator with good motor skills and quickly, so that support is particularly advantageous here.

BRIEF DESCRIPTION OF THE FIGURES

Further features and advantages are shown in FIG. 1.

FIG. 1 shows a schematic and non-scaled representation of a container handling system with an exoskeleton attached to an operator.

DETAILED DESCRIPTION

FIG. 1 shows an example of a container handling system 1 in the form of a labeling machine, whereby the object to be lifted here comprises a system part 2 to be lifted, here a vacuum cylinder for holding and transporting labels. However, it can also be any other type of container handling system and the objects to be lifted can also be other system parts and/or working materials.

Furthermore an exoskeleton 3 is shown, which is attached to an operator. In this example, the exoskeleton is attached to both arms and to the trunk of the operator, for example in the form of rails and buckles. However, it is conceivable that the exoskeleton is attached to only one arm and the torso, or only to one or both arms and not to the torso. Other attachment mechanisms are also conceivable.

In this example, the exoskeleton comprises two drives 5 (because of the perspective only one of the drives is visible in FIG. 1, each of which is assigned to one of the arms. However, it is also conceivable that only one drive is provided. In this case, the force can be transferred to different parts of the exoskeleton, if necessary, by appropriate redirection.

The exoskeleton also includes traction elements 6, which transmit the force from the actuators to the respective arm. The traction elements can be in the form of belts or rods, for example. The exoskeleton can also have deflector elements 7, as shown here, which are configured to adjust the direction of the force. For example, these can be joints.

The container handling system may also include a control unit 8 configured to control the drive(s) of the exoskeleton. Where appropriate, appropriate data links may also be provided between the control device and the drives.

Furthermore, an input device 9 may be provided, for example in the form of a touch screen, by means of which the operator can identify himself/herself and/or set the task to be performed.

The control device and the input device can each be separate from the exoskeleton, as shown here. However, it is also conceivable that one or both are part of the exoskeleton.

Furthermore a weight 10 is shown here, which serves as a counterweight to stabilize the operator.

For example, the exoskeleton can help the operator to lift the system part to be dismounted in order to remove it, and to set it down again at another location. Especially the lifting and lowering movements can be supported. The exoskeleton can also support the operator in lifting and setting down the system part to be inserted.

It goes without saying that as an alternative or in addition to support for moving system parts, the exoskeleton can also support the movements of the operator when moving working material, for example cardboard boxes, or the containers.

In particular, the invention is not limited to the features and combinations of the embodiments, especially the FIG. 1. Rather, the above features can be combined as desired.

The invention claimed is:

1. A container handling system for handling containers, comprising an exoskeleton which is configured in such a way that it supports movements carried out by an operator of the container handling system for lifting and/or lowering objects,
   wherein the exoskeleton is configured such that it is adaptable to the operator automatically, and the container handling system is configured such that for automatic adaptation, the respective operator is identified,
   wherein the exoskeleton is configured to be attachable to one or both arms of the operator, and
   wherein the exoskeleton includes a counterweight configured and arranged to stabilize the operator.

2. The container handling system according to claim 1, wherein the exoskeleton is configured in such a way that it enables the operator himself to grip an object to be lifted and to control the movements for lifting and/or lowering completely or partially by himself.

3. The container handling system according to claim 1, wherein the exoskeleton is configured in such a way that it is adaptable to a physique of the operator, including to body height, leg length, torso length and/or arm length, and/or to a constitution of the operator, for example proportion of muscle mass and/or strength in the torso and/or arms.

4. The container handling system according to claim 1, comprising a control device, wherein the exoskeleton is controllable by means of the control device in such a way that task-specific support is provided.

5. The container handling system according to claim 4, comprising an input device with which the task to be performed is settable by the operator, by means of manual input or speech input, and/or a task recognition device which is configured in such a way that it automatically recognizes the task to be performed, including on the basis of an operator position relative to system parts of the container handling system and/or on the basis of pattern recognition, in which movements of an operator are detected and automatically analyzed and the task to be performed which is assigned to a movement pattern is identified on the basis of a movement pattern recognized in an analysis.

6. The container handling system according to claim 1, the task to be performed comprising one or more of the following tasks:
   blow mold change on a blow molding machine for blow molding containers;
   changing modular units on modular machines, for example printing machines for printing containers or labeling machines;
   replacement of a vacuum cylinder for holding and transporting labels in labeling machines;
   replacement of format-dependent container transport devices and/or container lifting devices, including dividing stars, lifting stars and/or lowering stars;
   inserting and/or changing of film rolls in packaging machines, for example rolls with shrink film;
   insertion of cardboard boxes into packing machines;
   insertion of layer pads in palletizing machines;
   emptying of collecting containers;
   exchange of rotary distributors and/or drives and/or gears.

7. The container handling system according to claim 1, wherein the containers include bottles or cans, and wherein the objects include system parts or working material.

8. The container handling system according to claim 1, wherein the exoskeleton includes traction elements for transmitting force from actuators to a respective arm, or wherein the exoskeleton has deflector elements configured to adjust a direction of a force, or wherein the exoskeleton is attachable to one or both arms of the operator in the form of rails or buckles.

9. The container handling system according to claim 8, wherein the traction elements are in the form of belts or rods.

10. The container handling system according to claim 8, wherein the deflector elements are joints.

11. A container handling system for handling containers, comprising an exoskeleton which is configured in such a way that it supports movements carried out by an operator of the container handling system for lifting and/or lowering objects, wherein the exoskeleton is configured such that it is adaptable to the operator automatically, and the container handling system is configured such that for automatic adaptation, the respective operator is identified, wherein the exoskeleton is configured to be attachable to one or both arms of the operator, and wherein the exoskeleton includes a counterweight configured and arranged to stabilize the operator;

wherein the identification of the operator is based on an automatic recognition of the operator, and wherein the automatic recognition is carried out by means of face recognition, a retina scanner, or a fingerprint reader.

12. The container handling system according to claim 11, wherein the exoskeleton includes traction elements for transmitting force from actuators to a respective arm, or wherein the exoskeleton has deflector elements configured to adjust a direction of a force, or wherein the exoskeleton is attachable to one or both arms of the operator in the form of rails or buckles.

13. The container handling system according to claim 12, wherein the traction elements are in the form of belts or rods.

14. The container handling system according to claim 12, wherein the deflector elements are joints.

15. The container handling system according to claim 11, wherein the exoskeleton is configured in such a way that it enables the operator himself to grip an object to be lifted and to control the movements for lifting and/or lowering completely or partially by himself.

16. The container handling system according to claim 11, wherein the exoskeleton is configured in such a way that it is adaptable to a physique of the operator, including to body height, leg length, torso length, and/or arm length, and/or to a constitution of the operator, for example, proportion of muscle mass and/or strength in the torso and/or arms.

17. The container handling system according to claim 11, further comprising a control device, wherein the exoskeleton is controllable by means of the control device in such a way that task-specific support is provided.

18. The container handling system according to claim 17, further comprising an input device with which the task to be performed is settable by the operator, by means of manual input or speech input, and/or a task recognition device which is configured in such a way that it automatically recognizes the task to be performed, including on the basis of an operator position relative to system parts of the container handling system and/or on the basis of pattern recognition, in which movements of an operator are detected and automatically analyzed and the task to be performed which is assigned to a movement pattern is identified on the basis of a movement pattern recognized in an analysis.

19. The container handling system according to claim 11, wherein the task to be performed comprises one or more of the following tasks:

blow mold change on a blow molding machine for blow molding containers;

changing modular units on modular machines, for example, printing machines for printing containers or labeling machines;

replacement of a vacuum cylinder for holding and transporting labels in labeling machines;

replacement of format-dependent container transport devices and/or container lifting devices, including dividing stars, lifting stars, and/or lowering stars;

inserting and/or changing of film rolls in packaging machines, for example, rolls with shrink film;

insertion of cardboard boxes into packing machines;

insertion of layer pads in palletizing machines;

emptying of collecting containers; and exchange of rotary distributors and/or drives and/or gears.

20. The container handling system according to claim 12, wherein the containers include bottles or cans, and wherein the objects include system parts or working material.

* * * * *